Dec. 15, 1953    H. H. DEDO    2,662,640
LENGTH-ASSORTING AND CONVEYING APPARATUS
FOR LUMBER AFTER DEKNOTTING OPERATIONS
Filed May 14, 1951    2 Sheets-Sheet 1
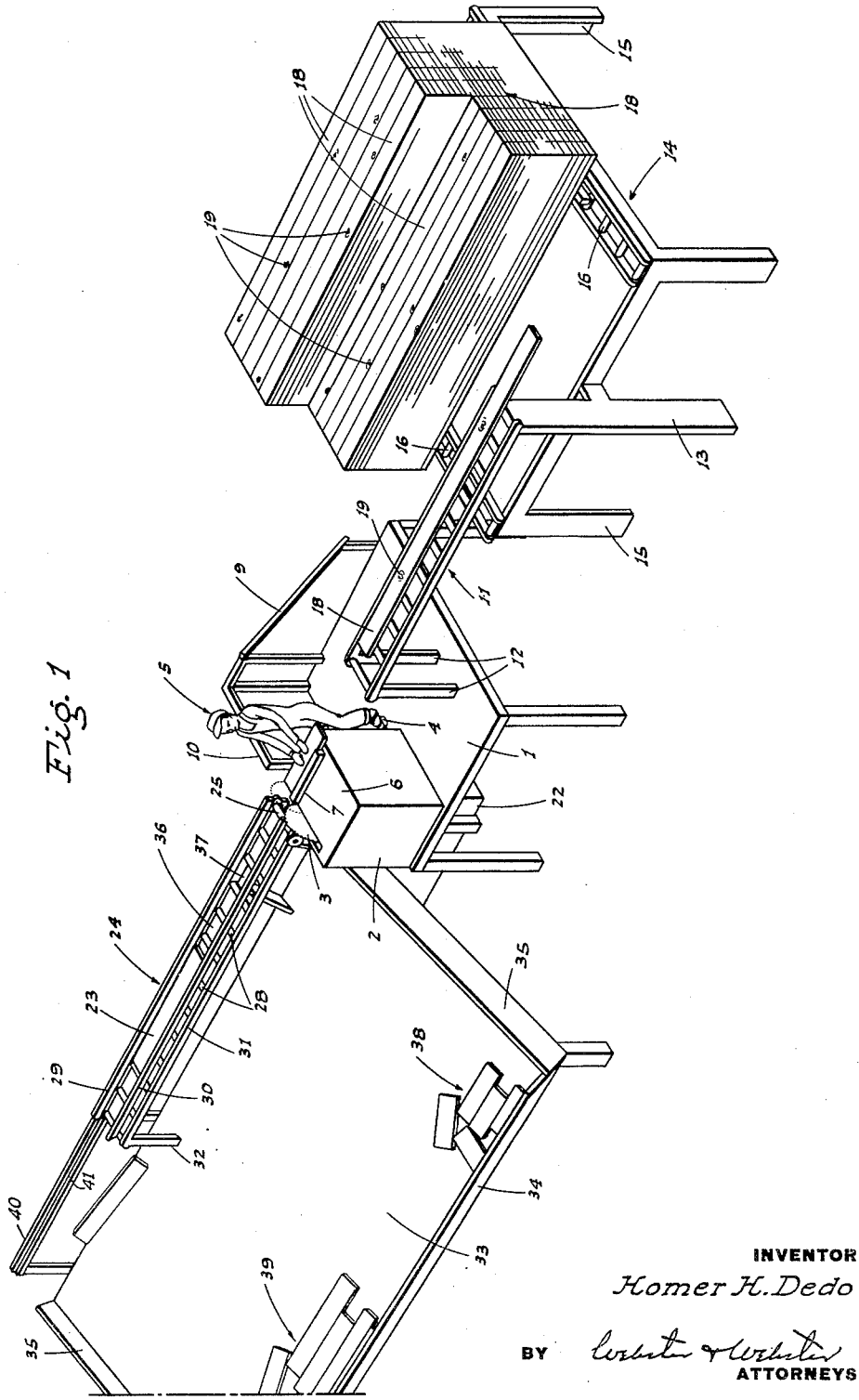
INVENTOR
*Homer H. Dedo*
BY *Webster & Webster*
ATTORNEYS

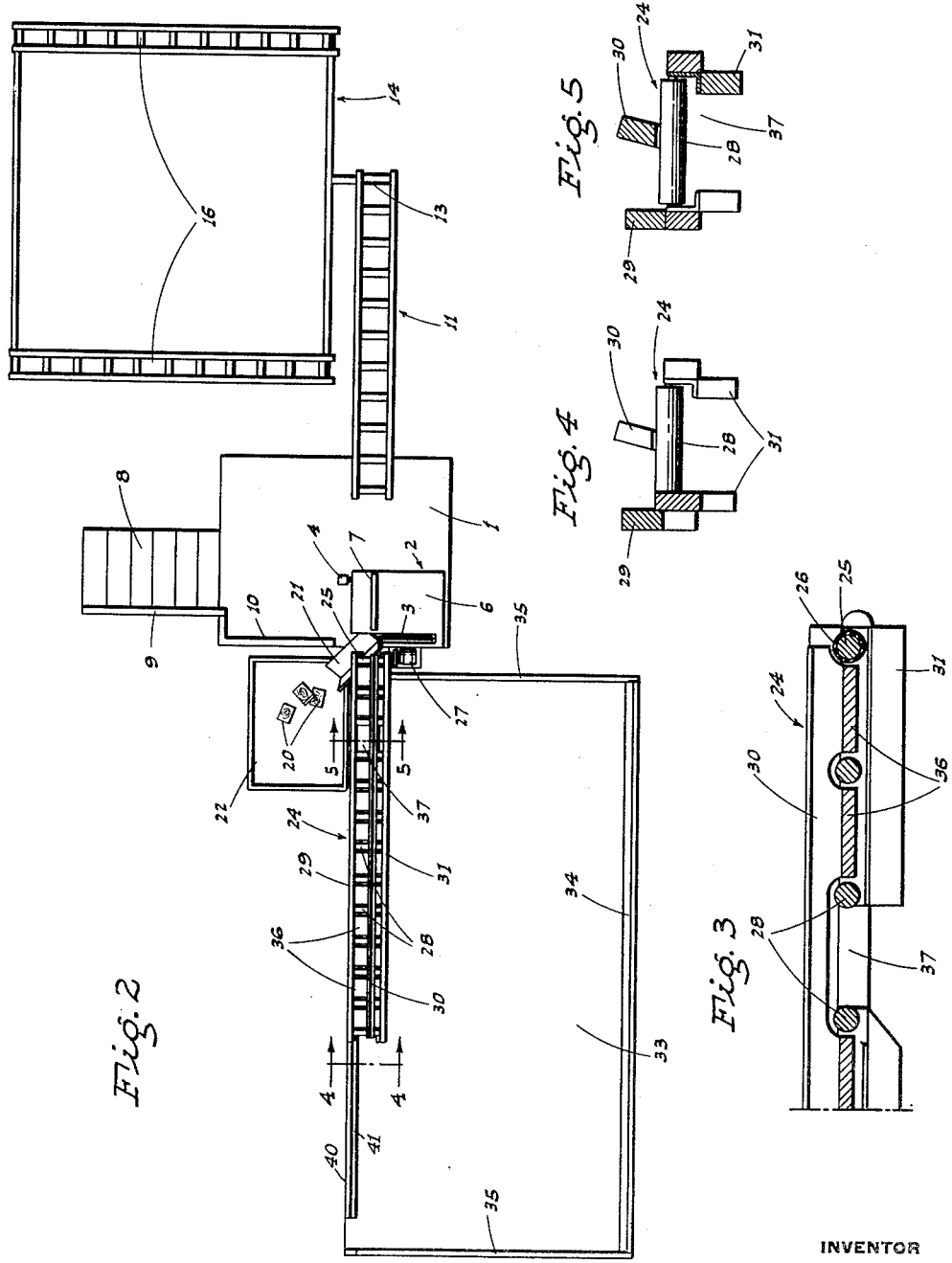

Patented Dec. 15, 1953

2,662,640

UNITED STATES PATENT OFFICE 2,662,640

LENGTH-ASSORTING AND CONVEYING APPARATUS FOR LUMBER AFTER DEKNOTTING OPERATIONS

Homer H. Dedo, Merced, Calif.

Application May 14, 1951, Serial No. 226,265

2 Claims. (Cl. 209—83)

This invention relates in general to the remanufacturing of lumber, and in particular is directed to apparatus especially designed—but not limited—for use in the Method of Producing Lengths of Lumber by Fingerjointing, as shown and described in copending application, Serial No. 223,618, filed April 28, 1951.

In such a method one of the primary steps is to cut relatively shorter lengths of clear lumber from initially longer lengths having knots or other imperfections therein at irregularly spaced points; the cut-out blocks which include the knots or imperfections being separated from the remaining, relatively shorter but odd lengths of clear lumber, and the latter being classified by length for subsequent use in the method.

It is the major object of this invention to provide novel apparatus for supporting and cutting the initially longer lengths of lumber to remove the knots or imperfections, as aforesaid; such apparatus being arranged to accomplish such cutting of the initial lengths successively, rapidly, and with a minimum of labor required.

A separate important object of the present invention is to provide apparatus, for the purpose described, which includes—beyond a cut-off saw unit—a novel conveyor assembly adapted to convey the cut, relatively shorter lengths of lumber to predetermined points; shorter lengths discharging at one point and longer lengths discharging at another point, with all lengths falling onto a chute positioned to receive and accumulate such roughly classified lengths in general separation.

It is also an object of the invention to provide lumber de-knotting and conveying apparatus which is designed for ease of construction, as well as convenience and economy of operation.

Still another object of the invention is to provide a practical and reliable lumber de-knotting and conveying apparatus, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the apparatus as in use.

Fig. 2 is a plan view of the same.

Fig. 3 is a fragmentary longitudinal sectional elevation of the carry-off conveyor.

Fig. 4 is a cross section on line 4—4 of Fig. 2.

Fig. 5 is a cross section on line 5— of Fig. 2.

Referring now more particularly to the characters of reference on the drawings, the apparatus comprises an elevated platform 1 suitably leg-supported from the ground, and on which a power driven, cut-off saw unit, indicated generally at 2, is mounted; such cut-off saw unit 2 including a normally retracted, circular or cut-off saw 3 adapted to be advanced by depression of a pedal 4 foot-actuated by an operator 5 standing on the platform 1 in front of the saw unit 2. The latter includes a saw table 6 having a longitudinal back stop 7 against which the work is adapted to be engaged for cut-off by the circular saw 3.

Access to the elevated platform 1 is gained by means of a stairway 8 having protective side railings 9; the right-hand one of which railings extends forwardly on the platform 1, as at 10, in guarding relation alongside the station at which the operator 5 stands.

A roller-type delivery conveyor, indicated generally at 11, is mounted horizontally in a plane above, and extends to, the platform 1 from a point a distance ahead thereof relative to the direction of travel of the lumber, as will hereinafter appear; such conveyor 11 being supported from the platform 1 by legs 12, and at the opposite end from the ground by a post 13.

Laterally of the outer end portion of the conveyor 11 the apparatus includes a platform 14 elevated above the ground by supporting legs 15, but disposed in a horizontal plane below the conveyor 11. The elevated platform 14 is fitted, along opposite side edges and on the top, with roller conveyors 16; the platform 14 and said roller conveyors 16 providing the support for a stack 17 of lumber. The stack 17 is comprised of a multiplicity of lengths 18 of lumber premilled to predetermined like width, thickness, and length; being of a grade which includes knots or other imperfections 19 irregularly spaced therein.

The lengths 18 of lumber in the stack 17 extend lengthwise of the apparatus, and the function of such apparatus is to cut out the knots or other imperfections 19, whereby to obtain relatively shorter but clear lengths of lumber for use in the production of finger jointed lumber, in the manner contemplated in the method of the aforesaid copending application.

From the stack 17 the lengths 18 of lumber are placed, one at a time and lengthwise, on the delivery conveyor 11, being advanced on said conveyor progressively across the saw table 6, riding against the longitudinal back-stop 7.

The operator maintains each length 18 of lumber against the longitudinal back-stop 7 by hand, as shown in Fig. 1, and also manipulates the lumber lengthwise; the circular cut-off saw 3 being actuated by the foot pedal 4 to make such cuts as are necessary to remove blocks 20 having the knots or imperfections 19 therein. As each such block 20 is cut, it drops from the circular cut-off saw 3 into a slide trough 21 which discharges into a catch box 22.

Beyond the lengths 18 of lumber being so cut, the resulting, relatively shorter clear lengths 23 are received on the near end of a longitudinally extending, roller-type, carry-off conveyor, indicated at 24. Said conveyor includes a multiplicity of transverse rollers; the initial or lead one of said rollers 25 having a friction face 26, and being driven by a motor and drive assembly, indicated generally at 27. The direction of drive is such that the friction face 26 turns forwardly at the top; i. e. away from the saw unit 2, whereby to initially power-advance the relatively shorter lengths 23 of lumber on said conveyor 24; the remaining rollers 28 of said conveyor being idlers.

Additionally, the carry-off conveyor 24 includes, at one side, a fixed longitudinal guide 29, and—above the rollers— a laterally adjustable, longitudinal guide 30, whereby the spacing between the guides 29 and 30 may be set to maintain lumber of a given width in proper lengthwise position on the conveyor.

The numeral 31 indicates the horizontal frame of the conveyor 24, which frame is supported at the ends by legs 32 from the upper edge portion of a relatively wide, flat chute 33 which inclines laterally outwardly and downwardly from below said cary-off conveyor 24, being suitably leg-supported from the ground, as shown. The chute 33 extends laterally of the carry-off conveyor 24 opposite the side from which the elevated platform 14 projects from the delivery conveyor 11; said chute 33 including an upstanding lower edge stop 34 and upstanding sides 35.

As the clear lengths 23 of lumber vary considerably in length, it is desirable that an initial rough classification be obtained, and the present apparatus accomplishes this result automatically, as follows:

The carry-off conveyor 24 includes filler boards 36 between adjacent idler rollers 28, except between one pair of the latter intermediate the ends of the conveyor, whereby to form a gap 37. The shortest of the lengths 23 of lumber—as feeding forwardly on the conveyor 24—will teeter and fall through the gap 37, dropping onto and sliding down the chute 33, to accumulate in a pile, indicated generally at 38.

The longest of the lengths 23 of lumber, moving forwardly on the carry-off conveyor 24, span the gap 37 and continue on said conveyor to its outer end, whence they drop onto the chute 33 and slide down it to accumulate in another pile 39. In this manner there is a rough classification by length of the lengths of lumber 23; i. e. the shortest in the pile 38, and the longest in the pile 39.

The fixed, longitudinal guide 29 of the conveyor 24 is extended as at 40 some distance beyond the outer end of the latter, and is formed as a support which is right-angle in cross section, to form horizontal ledge 41 substantially level with conveyor 24 so that when the longest of the lengths 23 of lumber reach the outer end of the conveyor 24, they are maintained horizontal until their full escape occurs. The advantage of this arrangement is that such lengths fall onto the chute lengthwise of the apparatus, and tend to maintain the same general position as they slide down the chute 33 and accumulate in the pile 39.

With the above described apparatus, the relatively short clear lengths 23 of lumber can be produced, conveyed, and roughly classified in an effective and expedient manner; the operation of the apparatus requiring a minimum of hand labor, and the rough classification by length which is attained reducing the extent to which the lengths 23 must be handled for subsequent full classification.

From the foregoing description it wil be readily seen that there has been produced such a device as substantially fulfills the objects of the invention as set forth herein.

While this specification sets forth in detail the present and preferred construction of the invention, still in practice such deviations therefrom may be resorted to as do not form a departure from the spirit of the invention, as defined by the appended claims.

What I claim is:

1. In a lumber-length segregating apparatus which comprises a horizontal conveyor to receive cut lengths lengthwise at one end of the conveyor, and arranged to convey said lengths along the same toward the other end of the conveyor for discharge, means intermediate the ends of the conveyor to discharge relatively short lumber lengths therefrom, the conveyor including an upstanding guide wall along one side against which one edge of the lengths of lumber moving along the conveyor may abut; an extension of said wall projecting beyond said other end of the conveyor, a horizontal ledge along the extension substantially alined with the conveyor and projecting transversely thereof a relatively short distance to support the adjacent edge portion of a relatively long length of lumber projecting beyond said other end of the conveyor while still being advanced along the same, and a chute under said extension and ledge projecting at a downward slope laterally of the conveyor to receive the last named lengths of lumber when such lengths have been advanced for substantially their full length along the ledge.

2. An apparatus as in claim 1, with a laterally adjustable guide on and extending along the conveyor to maintain the lengths of lumber on the conveyor confined between said guide and the upstanding wall.

HOMER H. DEDO.

References Cited in the file of this patent

UNITED STATES PATENTS

| Number | Name | Date |
| --- | --- | --- |
| 296,334 | Jones | Apr. 8, 1884 |
| 378,796 | Linderman | Feb. 28, 1888 |
| 1,277,326 | Lohman | Aug. 27, 1918 |
| 1,454,992 | Willette | May 15, 1923 |
| 1,767,012 | Pfau | June 24, 1930 |
| 1,907,564 | Osborn et al. | May 9, 1933 |
| 2,356,295 | Yost | Aug. 22, 1944 |
| 2,563,867 | Rathert et al. | Aug. 14, 1951 |
| 2,600,147 | Wilson | June 10, 1952 |